March 3, 1970     B. WEISSMAN     3,497,953

DENTAL PROSTHETIC STRUCTURE HOLDING DEVICE

Filed Nov. 1, 1968     2 Sheets-Sheet 1

INVENTOR.
BERNARD WEISSMAN

BY *Friedman & Goodman*
Attorneys

INVENTOR.
BERNARD WEISSMAN

United States Patent Office 3,497,953
Patented Mar. 3, 1970

3,497,953
DENTAL PROSTHETIC STRUCTURE HOLDING DEVICE
Bernard Weissman, 304 Ashland Place, Brooklyn, N.Y. 11217
Filed Nov. 1, 1968, Ser. No. 772,481
Int. Cl. A61c *13/00;* C08f
U.S. Cl. 32—10                                                      4 Claims

ABSTRACT OF THE DISCLOSURE

A device for connecting a dental prosthetic structure, such as a crown, bridge, false tooth, etc., to the patient's jawbone, the device having engaging elements movable from a storage position within the body into a horizontally extending position therefrom in which firm engagement is made to the jawbone, the dental prosthetic structure then being advantageously secured to the upper exposed portion of the device.

---

The present invention relates generally to improvements for dental prosthetic structures, and more particularly to a device, used in practice with a dental prosthetic structure, which is readily and effectively connected first to the patient's jawbone and then to the prosthetic structure to thereby firmly hold the latter in place.

It is necessary that the securement of a dental prosthetic structure be sufficiently firm to not only maintain its position relative to the patient's natural teeth but also to withstand the stress and strain forces of mastication. In accordance with present practice, this is achieved by attaching the prosthetic structure to the adjacent natural teeth, but this significantly increases the forces transmitted to these natural teeth and thus often results in their damage.

Broadly, it is an object to provide an improved prosthetic structure holding device overcoming the foregoing and other shortcomings of the prior art. Specifically, it is an object to provide a holding device which can readily and effectively be used to form a supporting connection for the prosthetic structure to the jawbone and thereby minimize, for all practical purposes, the strain placed on and transmitted to the patient's natural teeth.

A holding device for use in securing a dental prosthetic structure in place demonstrating objects and advantages of the present invention includes a hollow, tubular body which is appropriately first imbedded in the jawbone and has an internal member formed with engaging elements thereon which, in practice, is forced down the tube such that the engaging elements make camming contact with the tube end closure and are in turn forced in a transverse direction from the tube into gripping engagement with the jawbone.

The above brief description, as well as further objects, features and advantages of the present invention, will be more fully appreciated by reference to the following detailed description of presently preferred, but nonetheless illustrative embodiments in accordance with the present invention, when taken in conjunction with the accompanying drawings, wherein:

FIG. 1 is a partial diagrammatic view, in perspective, illustrating use of the holding device hereof in association with a false tooth;

FIG. 2 is a partial elevational view, on a greatly enlarged scale, illustrating further structural details of the holding device, portions thereof being broken away to better illustrate these structural features;

FIG. 3 is an elevational view, also on a greatly enlarged scale, similar to FIG. 2 but illustrating the holding device in its engaged condition to the jawbone;

FIG. 4 is a plan view projected from FIG. 3 but with the jawbone omitted to better illustrate structural features of the device;

Figure 1:
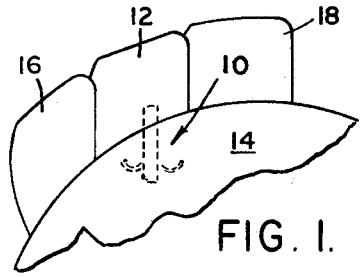
FIGS. 1–4 illustrate a first embodiment of the invention, namely, to wit.

Reference is now made to the drawings, and in particular to FIGS. 1–4, illustrating a first embodiment of a holding device, generally designated 10, useful in the construction or securement of a dental prosthetic structure such as a bridge, crown, or, as illustrated in FIG. 1, a false tooth 12. As generally understood, it is desirable that the false tooth 12 be firmly connected or anchored to the jawbone 14 rather than to the adjacent natural teeth 16, 18 and, to this end, the holding device 10 is effective in achieving this result in a manner as is hereinafter set forth in detail.

Specifically, the holding device 10 includes a hollow, cylindrical body 16 which has an internally threaded surface 16a which bounds a longitudinal chamber open at its upper proximal end 16b (see FIG. 3) and closed at its distal end by a closure 16c which has a camming surface 16d in facing relation to the internal body longitudinal chamber, the function of which camming surface 16d will soon be apparent. Body 16 has two exit openings 16e, 16f in opposing wall portions and at locations adjacent the end closure 16c so that the camming surface 16d actually cooperates with the body 16 to bound the lower portion of each of the openings 16e, 16f.

Figure 2:
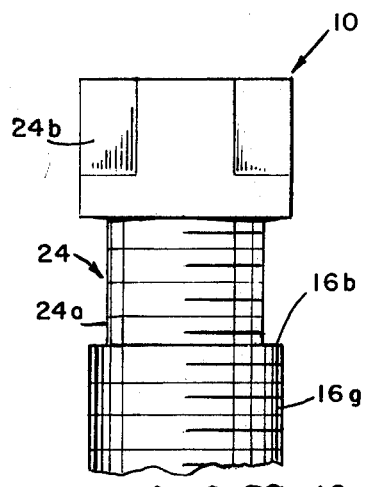
Figure 2:
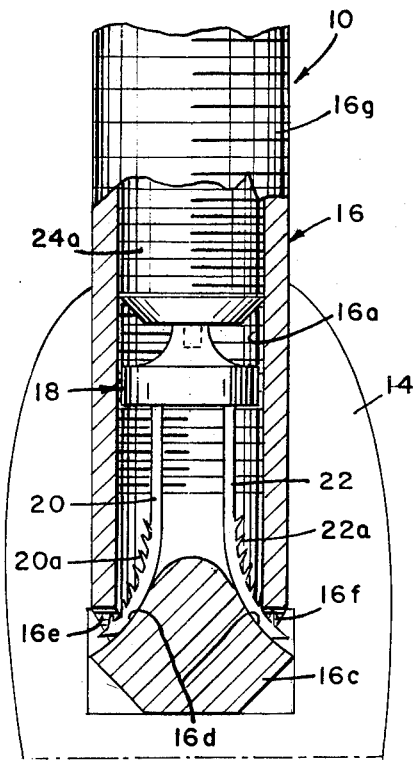

Disposed for longitudinal movement within the hollow body 16 is an operative member 18, including a head 18a and two engaging elements 20, 22, depending from the head 18a and factory-loaded within the bore 16a such that the respective free ends 20a, 22a of these elements project slightly through the exit openings 16e, 16f. Specifically, each engaging element 20, 22 is fabricated of a bendable material of construction such that when the operative member 18 is forced down in the direction of the closure 16c, each element 20, 22 makes camming contact with the camming surface 16d and is cammed out of the vertical plane which each initially occupies, as illustrated in FIG. 2, into a horizontal plane. In the process, each element 20, 22 is projected fully out of one of the exit openings 16e, 16f, all as is more particularly illustrated in FIG. 3.

The movement of the operative member 18 from its clearance position of FIG. 2 into its position adjacent the closure 16c is achieved by threaded adjustment of a threaded member 24, the threads along the body 24a of which cooperate with the internal threads of the longitudinal chamber 16a so that the member 24, when manipulated through rotative movement by a wrench or similar instrument engaged with its hexagonal head 24b, is effectively moved along the chamber 16a and thus drives the operative element 18 through the previously noted movement which results in the depending, engaging elements 20, 22 thereof being respectively cammed and projected through the exit openings 16e, 16f.

Figure 3:
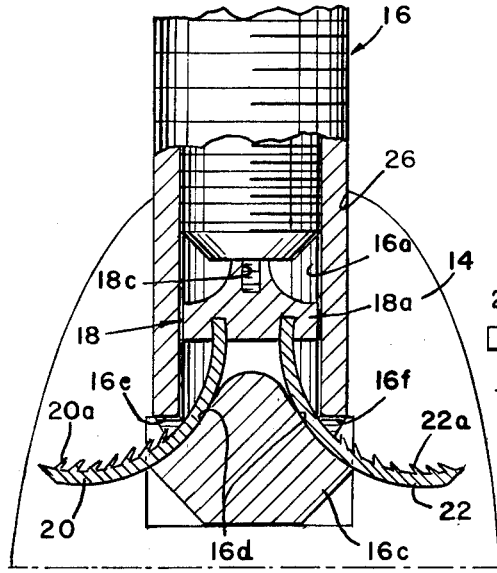
Figure 4:
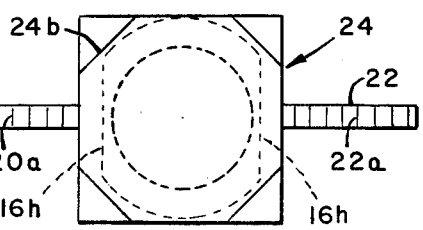

In a typical use of the holding device 10, such as anchoring or securing a false tooth 12 to a jawbone 14, the first contemplated step consists in achieving an initial contact between external self-tapping threads 16g and a bore 26, the bore 26 naturally being located in that portion of the jawbone 14 coextensive with the area that the false tooth 12 is to be placed. Thus body 16 is threaded into position with a wrench or other tool adapted to engage the body 16 along flats 16h machined at opposite sides of the upper end of body 16 (see FIG. 4). The holding device 10, and more particularly the cylindrical body 16 thereof, is thus only held within the bore 26 by the threads 16g, which is insufficient as a supporting connection for the false tooth 12 but adequate to facilitate producing movement in the factory-loaded element 18. Specifically, threaded member 24, in threaded engagement with the internally threaded bore 16a is next appropriately threadably adjusted so as to drive the operative member 18 from its initial clearance position through movement to the position depicted in FIG. 3, during which the bendable, engaging elements 20, 22 make camming contact with the camming surface 16d and, as a result thereof, are cammed or bent out of their initial vertical plane into the horizontal plane in which they make engaging contact with the jawbone 14. To this end, each engaging element 20, 22 in addition to the previously noted points 20a, 22a, has a series of holding prongs 20b, 22b which are each inclined opposite to the direction of movement of the engaging element so as to minimize the possibility of any reverse direction or disengaging movement of the elements 20, 22. In the few instances where it may be necessary to do so, however, the head 18a includes a threaded opening 18c which may be threadably engaged by a retracting tool and in response to a sufficient force is effective in withdrawing the operative member 18 from its engaged condition to the jawbone 14. In the more usual circumstances, however, after completing engagement of the engaging elements 20, 22 to the jawbone 14, any portion of the threaded section of the threaded member 24 extending above the body top 16b such as the illustrated section in FIG. 3, is removed from the body 16 and the shortened threaded member is then returned to the threaded bore 16a and threadably adjusted such that the head 24b thereon comes to rest against the body top 16b. Thus, threaded member 24 is effective in holding the operative member 18 in its condition depicted in FIG. 3, in which condition the engaging elements 20, 22 of the operative member 18 are firmly engaged with the jawbone 14. Returning to FIG. 1, it will be further noted that it is contemplated that the upper portion 10a of the holding device 10 will extend in an exposed position from the jawbone 14 and thus effectively serve as an anchor structure for the false tooth 12.

Figure 5:
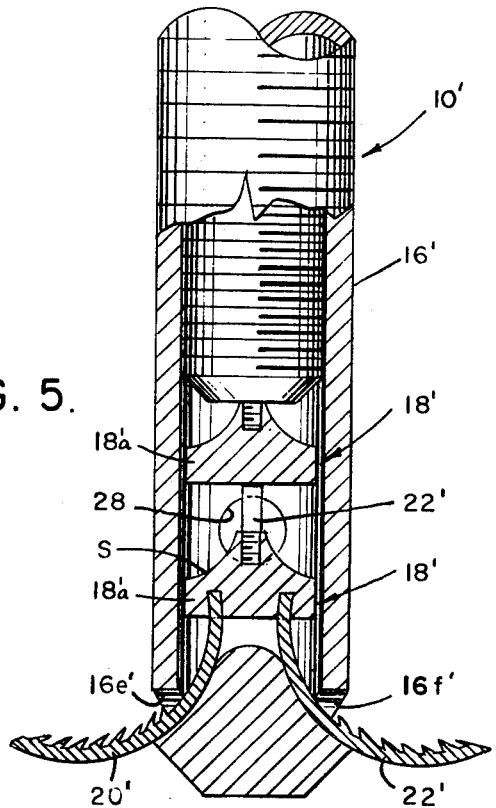
FIGS. 5 and 6 are illustrations of a second embodiment of the holding device hereof, FIG. 5 being an elevational view similar to FIG. 3 and FIG. 6 being a plan view similar to FIG. 4.
Figure 6:
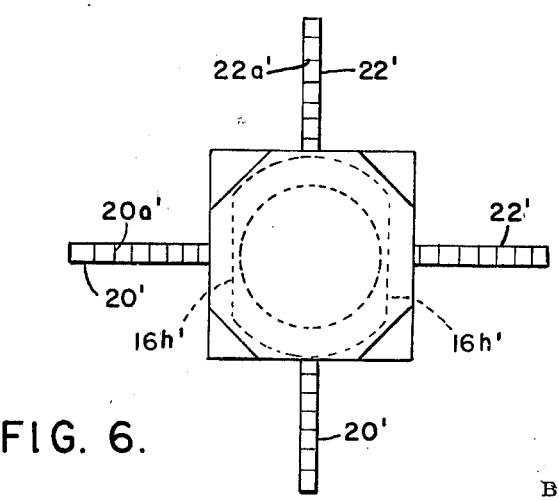

In the second embodiment of the holding device hereof, as illustrated in FIGS. 5, 6, the structural features thereof which are similar to structural features already described are designated by the same but primed reference numerals and, for brevity sake, a description of these similar structural features is omitted. The second embodiment 10' essentially differs from the already described embodiment in that use is made of two identically constructed operative members 18', these two members being disposed with the engaging elements 20', 22' thereof at right angles to each other so that these engaging elements are circumferentially spaced about the longitudinal axis of the body longitudinal chamber 16a', all as is best illustrated in FIG. 6. In embodiment 10', the significant structural differences are that the first operative member 18' which is loaded within the body 16' has a camming surface S thereon which performs the same function for the second or additional operative member 18' that the closure member camming surface 16d' performs for the first loaded operative member, namely, in causing projection of the engaging elements 20', 22' through body exit openings. Naturally, the two additional exit openings required are provided in appropriate strategic locations in the body 16' to accommodate the two additional engaging elements 20', 22' of the additional operative member 18', only one such exit opening designated 28b being illustrated in FIG. 5. Thus, in embodiment 10', two operative members 18' in piggyback fashion are used with the result that there are twice as many, namely, four engaging elements 20', 22' effectively used to complete the engaging contact to the jawbone.

A latitude of modification, change and substitution is intended in the foregoing disclosure and in some instances some features of the invention will be employed without a corresponding use of other features.

What is claimed is:

1. A dental prosthetic structure holding device comprising a hollow, cylindrical body having an internally threaded surface bounding a longitudinal chamber therein, a distal end closure for said longitudinal chamber having a camming surface bounding the lower end of said longitudinal chamber, said body having at least two exit openings in the distal end thereof in communication with said lower end of said longitudinal chamber and located adjacent said camming surface, an operative member having depending bendable engaging elements thereon operatively arranged in said longitudinal chamber for movement toward said camming surface such that said bendable engageable elements make camming contact therewith preparatory to being projected from said longitudinal chamber through said exit openings, and a threaded member threadably engaged to said longitudinal chamber threaded surface and effective upon threaded adjustment thereof to urge said operative member through said movement thereof resulting in the projecting of said operative member engaging elements through said body exit openings.

2. A dental prosthetic structure holding device as defined in claim 1 wherein said engaging elements have gripping prongs thereon to contribute to effectuating gripping engagement thereof.

3. A dental prosthetic structure holding device as defined in claim 1 wherein said body has two additional exit openings therein and an additional operative member with depending bendable engaging elements thereon is disposed in said body longitudinal chamber in superposed relation to said other operative member, and said last named other operative member has a camming surface thereon effective to make camming contact with said engaging elements of said additional operative member preparatory to the projecting of said engaging elements through said two additional exit openings.

4. A dental prosthetic structure holding device as defined in claim 3 wherein said engaging elements of said operative member are circumferentially spaced about the longitudinal axis of said longitudinal chamber.

References Cited

UNITED STATES PATENTS

| 2,721,387 | 10/1955 | Ashuckian | 32—10 |
| 2,745,180 | 5/1956 | Kiernan | 32—10 |
| 2,857,670 | 10/1958 | Kiernan | 32—10 |

ROBERT PESHOCK, Primary Examiner